United States Patent
Pham et al.

(10) Patent No.: US 10,148,594 B2
(45) Date of Patent: Dec. 4, 2018

(54) APPLICATION BASED CONDITIONAL FORWARDING AND LOAD BALANCING IN A SOFTWARE DEFINED NETWORKING (SDN) ARCHITECTURE

(71) Applicant: Fortinet, Inc., Sunnyvale, CA (US)

(72) Inventors: Son Pham, San Jose, CA (US); Donald Krall, San Jose, CA (US); Venkateswara Adusumilli, San Jose, CA (US); Edward Lopez, South Riding, VA (US); Neil Huynh, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 236 days.

(21) Appl. No.: 14/985,811

(22) Filed: Dec. 31, 2015

(65) Prior Publication Data

US 2017/0195254 A1    Jul. 6, 2017

(51) Int. Cl.
*H04L 12/947* (2013.01)
*H04L 12/935* (2013.01)
(Continued)

(52) U.S. Cl.
CPC .......... *H04L 49/25* (2013.01); *H04L 41/0896* (2013.01); *H04L 41/20* (2013.01);
(Continued)

(58) Field of Classification Search
CPC ....... H04L 49/25; H04L 49/30; H04L 45/745; H04L 69/22; H04L 41/20
See application file for complete search history.

(56) References Cited

U.S. PATENT DOCUMENTS

| 7,539,845 B1 | 5/2009 | Wentzlaff et al. |
| 9,269,439 B1 | 2/2016 | Levy et al. |

(Continued)

FOREIGN PATENT DOCUMENTS

| WO | WO 2014198202 A1 * | 12/2014 | ......... H04L 12/6418 |
| WO | WO 2015041706 A1 * | 3/2015 | ......... H04L 12/6418 |

OTHER PUBLICATIONS

"OpenFlow Switch Specification." Open Networking Foundation. Oct. 14, 2013. 206 pgs.

(Continued)

*Primary Examiner* — Feben Haile
(74) *Attorney, Agent, or Firm* — Hamilton, DeSanctis & Cha LLP

(57) ABSTRACT

Systems and methods for an SDN switch that provides application-based conditional forwarding and session-aware load balancing are provided. According to one embodiment, a packet is received at an input port of a Software Defined Networking (SDN) switch. The packet is forwarded by the SDN switch to a first flow processing unit (FPU) of multiple FPUs of the SDN switch. The first FPU determines whether the packet is to be tracked. And, if so, the received packet is transmitted to a second FPU of the SDN switch; otherwise, the packet is transmitted to a third FPU of the SDN switch. When the packet is received at the second FPU, the packet is conditionally forwarded by the SDN switch to an application device. When the packet is received at the third FPU, the packet is conditionally forwarded to an output port or dropped.

8 Claims, 10 Drawing Sheets

(51) Int. Cl.
- *H04L 12/741* (2013.01)
- *H04L 29/06* (2006.01)
- *H04L 12/26* (2006.01)
- *H04L 12/24* (2006.01)

(52) U.S. Cl.
CPC .......... *H04L 43/026* (2013.01); *H04L 45/745* (2013.01); *H04L 49/30* (2013.01); *H04L 69/22* (2013.01); *H04L 43/028* (2013.01)

(56) References Cited

U.S. PATENT DOCUMENTS

| | | |
|---|---|---|
| 9,386,041 B2 | 7/2016 | Carver et al. |
| 9,407,549 B2 | 8/2016 | Mosko et al. |
| 9,565,135 B2 | 2/2017 | Li et al. |
| 9,565,204 B2 | 2/2017 | Chesla |
| 9,692,689 B2 | 6/2017 | Arumugam et al. |
| 2013/0230047 A1 | 9/2013 | Subrahmaniam et al. |
| 2014/0241356 A1 | 8/2014 | Zhang et al. |
| 2015/0026800 A1 | 1/2015 | Jain |
| 2015/0180783 A1 | 6/2015 | Crasta et al. |
| 2016/0065452 A1 | 3/2016 | Kruglick |
| 2016/0072717 A1 | 3/2016 | Ansari et al. |
| 2016/0094449 A1 | 3/2016 | Ramia et al. |
| 2016/0094460 A1 | 3/2016 | Shelar et al. |
| 2016/0112503 A1* | 4/2016 | Yang .................. H04L 12/6418 709/223 |
| 2016/0182378 A1 | 6/2016 | Basavaraja et al. |
| 2016/0205071 A1* | 7/2016 | Cooper ............... H04L 12/6418 726/1 |
| 2016/0218973 A1 | 7/2016 | Anand et al. |
| 2016/0301603 A1 | 10/2016 | Park et al. |
| 2016/0315880 A1 | 10/2016 | Guo et al. |
| 2016/0330076 A1 | 11/2016 | Tiwari et al. |
| 2016/0344590 A1 | 11/2016 | Huey et al. |
| 2017/0019335 A1 | 1/2017 | Schultz et al. |
| 2017/0041230 A1 | 2/2017 | Huang et al. |
| 2017/0093681 A1 | 3/2017 | Chaubey et al. |
| 2017/0149640 A1 | 5/2017 | Narayanan et al. |
| 2017/0180234 A1 | 6/2017 | Agrawal et al. |
| 2017/0195253 A1 | 7/2017 | Annaluru et al. |
| 2017/0195255 A1 | 7/2017 | Pham et al. |
| 2017/0195257 A1 | 7/2017 | Annaluru et al. |
| 2017/0195292 A1 | 7/2017 | Pham et al. |

OTHER PUBLICATIONS

Non-Final Rejection for U.S. Appl. No. 14/985,746 dated Jul. 13, 2017.
Non-Final Rejection for U.S. Appl. No. 14/985,783 dated Oct. 6, 2017.
Non-Final Rejection for U.S. Appl. No. 14/985,819 dated Aug. 25, 2017.
Non-Final Rejection for U.S. Appl. No. 14/985,827 dated Oct. 6, 2017.
Notice of Allowance for U.S. Appl. No. 14/985,827 dated Jun. 6, 2018.
Final Rejection for U.S. Appl. No. 14/985,819 dated Jan. 26, 2018.
Notice of Allowance for U.S. Appl. No. 14/985,819 dated Apr. 26, 2018.
Notice of Allowance for U.S. Appl. No. 14/985,783 dated May 1, 2018.

* cited by examiner

APPLICATION BASED CONDITIONAL FORWARDING AND LOAD BALANCING IN A SOFTWARE DEFINED NETWORKING (SDN) ARCHITECTURE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015, Fortinet, Inc.

BACKGROUND

Field

Embodiments of the present disclosure generally relate to software-defined networking (SDN). In particular, embodiments of the present disclosure relate to an SDN switch configured to provide application-based, conditional forwarding and load balancing (flow forwarding).

Description of the Related Art

Global Internet Protocol (IP) traffic has increased fivefold in the last five years, and is expected to increase another threefold over the next five years. As the number of mobile devices and other IP devices connecting to the Internet are growing rapidly, data traffic that needs to be monitored and inspected by network security devices is also increasing. Such increasing data traffic from different types of devices is creating new vulnerabilities that need to be monitored/inspected and controlled by the network security devices. As new types of network security issues are emerging, network security devices also need to include new policy rules to monitor and control data traffic to/from a secured network. It is becoming difficult for hardware-based switches or network security devices to provide the required scalability for rapidly increasing data traffic and increasing policy rules. To overcome the limitations of existing hardware-based switches or network security devices, which lack the flexibility of incorporating new and different forwarding rules, SDN devices that allow updates at regular intervals have been proposed for providing scalable and fast processing of network packets.

With such features, typical SDN devices, e.g., SDN switches, are moving to replace, and are being configured to work in conjunction with traditional routers and switches in several high-end applications including the emerging cloud and datacenter environments where high volumes of traffic need to be monitored and filtered. SDN is an approach to computer networking that allows network administrators to manage network services through abstraction of lower-level functionality. This is done by decoupling the operating system that makes decisions about where the traffic is sent (the control plane) from underlying hardware systems that forward traffic to the selected destinations (the data plane).

One aspect of SDN is the separation or abstraction of the control plane from the data plane. A typical enterprise network device may have a controlling element, and a forwarding element within the same box that implements the SDN features. The forwarding elements are configured to receive packets, do conversion(s) if required, and forward the packets to their respective destinations based on instructions received from the controlling elements. In implementation, forwarding elements (also referred to as the data plane) receive forwarding commands from the control plane (also referred to as the controller) where the forwarding elements make the forwarding decision to be implemented in the data plane. The control plane is typically a collection of software running within a router or within a switch that uses one or more rule sets to identify the packet(s) received from traffic, decide appropriate actions to be taken on the packet(s), and convey the actions/decisions to the data plane so the data plane knows where to forward the packet(s).

To allow communications between different network devices or SDN devices, the OpenFlow protocols, including, but not limited to Open Networking Foundation (ONF), "OpenFlow Switch Specification," Version 1.5.0 (Protocol version 0x06), Dec. 19, 2014 (hereafter, the "OpenFlow Protocol"), are now being used. The OpenFlow Protocol is hereby incorporated by reference in its entirety for all purposes. The OpenFlow Protocol intends to provide access to the data plane of a network device or an SDN device to other network devices and/or SDN devices in addition to providing a protocol for device configuration. The OpenFlow standard was defined to increase flexibility and programmability of networks/network devices in order to allow network administrators to more easily tailor network configurations to their needs. The OpenFlow Protocol requires an SDN switch to contain a series of associative flow tables, wherein each entry in a flow table may contain ternary values for a desired selection of packet fields (e.g., Media Access Control (MAC) source and destination addresses, IP source and destination addresses, Transmission Control Protocol (TCP) port numbers and the like). The OpenFlow Protocol defines a number of standardized packet header fields for matching as well as allowing users to add their own custom fields. Table entries are in prioritized order, and for each individual packet to be processed by the SDN switch, the table entries are searched for a matching entry. Note that, the table entries can have ternary values to match a broad selection of packets. When the first matching table entry is found within the flow table, a set of actions associated with the matching flow table entry can be executed. Such actions may modify the fields of the packet, for example, by setting the MAC destination field to a new value, and may also direct the SDN switch to output the packet to a particular switch port in a particular queue, or send it to an SDN software controller, or drop the packet. It is generally intended that when the existing flow tables do not contain a matching flow table entry, the packet is sent to the controller, which may respond by installing rules within the switch to properly process subsequently received similar packets. This accomplishes the goal of control plane and data plane separation by having the SDN controller software make the decisions concerning what flow tables are to be installed, whereas the SDN switch simply follows the directives of the controller instead of making complex behavioral decisions on its own. In general, existing SDN switches are configured to be able to flexibly match against packets, and directed by the matches, perform a comprehensive set of actions to modify the packet and decide what to do with it.

SDN architectures that use the OpenFlow Protocols provide a high degree of dynamic flexibility to define new rules to be used, and actions to be taken by the network security devices. SDN architectures that use the OpenFlow Protocol lead to adaptation of more flexible system hardware architecture and implementation to enable quick turnkey solutions for concurrent deployment of various types of network applications.

While SDN architectures have addressed various limitations in the art, existing SDN architectures remain inadequate in relation to flexibly dealing with traffic volume that the SDN controller and attached SDN switches can handle.

Data flow in a network may be related to/associated with different types of applications, and therefore data flow needs to be differentially treated by the SDN switches and/or network security devices. Ideally, traffic received by the SDN controller should be forwarded conditionally to one or more switches based on the application associated with the data flow or data packet. For efficient utilization of the SDN switches and/or network security devices, it is also desirable for the load on different SDN switches and/or network security devices to be distributed substantially evenly. The SDN controller should also be able to transfer load from one switch to another, or from one port to another without disturbing the established session integrity.

SUMMARY

Systems and methods are described for an SDN switch that provides application-based conditional forwarding and session-aware load balancing. In an aspect, the present disclosure relates to a system that can include a packet receive module that can be configured to, at an SDN switch, receive a packet at an input port, and a packet forwarding module that can be configured to, at the SDN switch, forward the received packet to a first flow processing unit of the SDN switch. The system can further include a tracking decision based packet transmission module that can be configured to, at the first flow processing unit, determine whether the received packet is to be tracked, wherein when the received packet is to be tracked, the received packet is transmitted to a second flow processing unit; otherwise, the packet is transmitted to a third flow processing unit. The system can further include a packet processing module that can be configured to, based on outcome of the tracking decision based packet transmission module, conditionally forward the packet to an application device if the packet is received at the second flow processing unit; otherwise, conditionally forward the packet to an output port or drop the packet if the packet is received at the third flow processing unit.

In an aspect, at the second flow processing unit, the packet can be forwarded to the application device when a session lookup match is found in the session table of the second flow processing unit; otherwise, when a session lookup match is not found, the packet can be forwarded to the third flow processing unit. In an aspect, at the second flow processing unit, the received packet can be processed for any or a combination of session setup, session update, or session delete. In another aspect, the application device can be a security application device.

In another aspect, at the third flow processing unit, the packet can be looked up into a flow table of the third flow processing unit to decide whether to drop the packet or forward the packet to the output port. In another aspect, the decision of whether the packet is to be tracked can be made based on parsing of the packet, and processing of the parsed packet with respect to a flow table that the first flow processing unit is operatively coupled with.

In another aspect, the first flow processing unit can be a type 1 flow processing unit, and the second and the third flow processing unit can be a type 2 flow processing unit, wherein the type 2 flow processing unit can include session tables. In an aspect, when a fourth flow processing unit of a type 1 flow processing unit receives a second packet, the fourth flow processing unit can determine if the second packet is to be tracked, wherein when the second packet is to be tracked, the second packet can be transmitted to the third flow processing unit; otherwise, the packet can be transmitted to the second flow processing unit, and wherein when the second packet is received at the third flow processing unit, the third flow processing unit can conditionally process the second packet at an application device; otherwise, if the second packet is received at the second flow processing unit, the second flow processing unit can conditionally either forward the packet to a second output port or can drop the second packet. In an aspect, direction from the first flow processing unit to the fourth flow processing unit can be from client to server, and wherein direction from the fourth flow processing unit to the first flow processing unit can be from server to client. In another aspect, direction from the first flow processing unit to the fourth flow processing unit can be from north to south, and wherein direction from the fourth flow processing unit to the first flow processing unit can be from south to north.

In an aspect, a packet processing method includes the steps of receiving, by an SDN switch, a packet at an input port, and forwarding the received packet to a first flow processing unit of the SDN switch. The method can further include the step of determining, by the first flow processing unit, if the received packet is to be tracked, wherein when the received packet is to be tracked, the received packet is transmitted to a second flow processing unit; otherwise, the received packet is transmitted to a third flow processing unit. The method can further include the step of conditionally forwarding, at the SDN switch, the packet to an application device if the packet is received at the second flow processing unit, and conditionally forwarding the packet to an output port or dropping the packet if the packet is received at the third flow processing unit.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
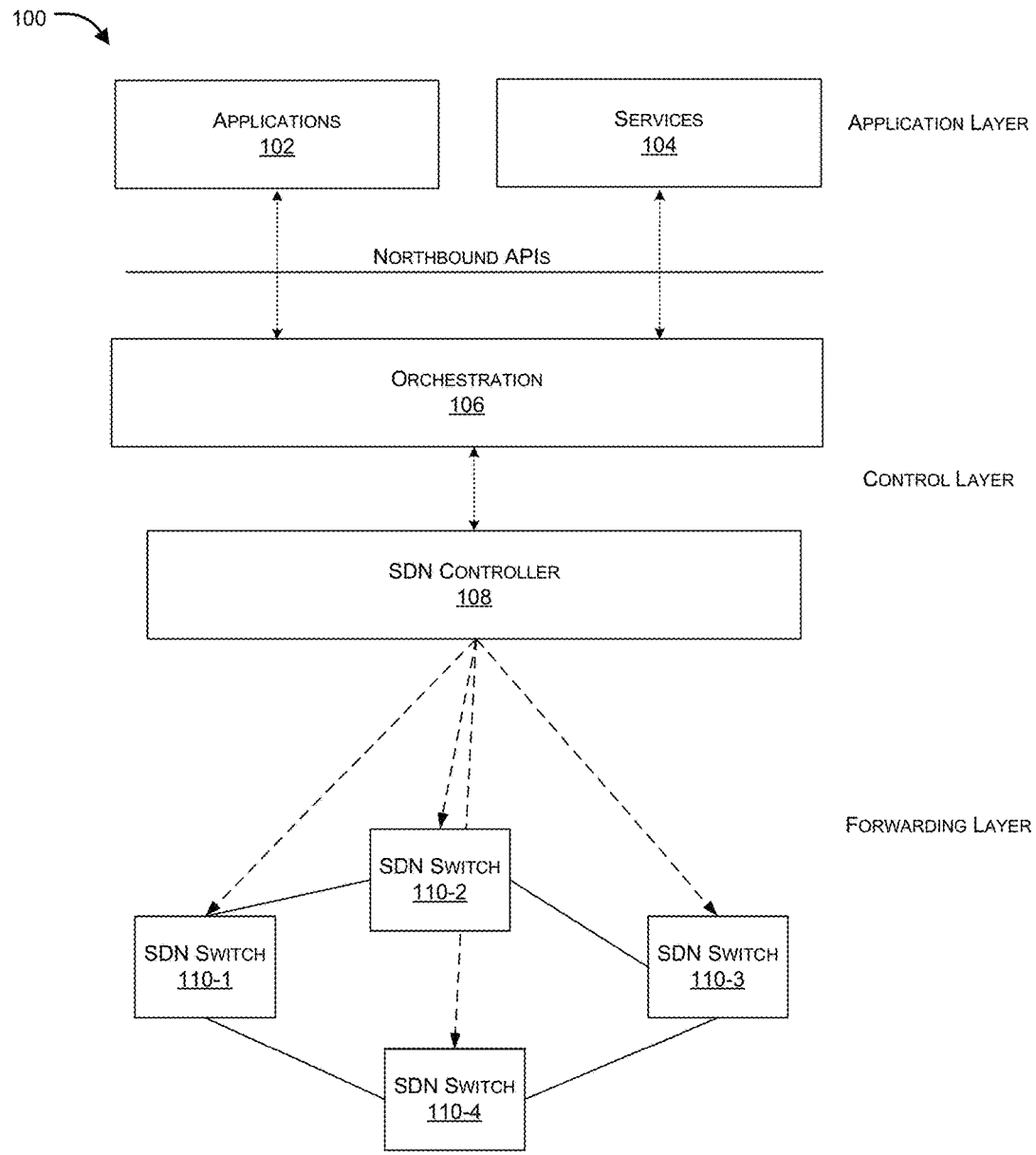
FIG. 1A illustrates an exemplary SDN architecture designed in accordance with an embodiment of the present invention.

Systems and methods are described for an SDN switch that provides application-based conditional forwarding and session-aware load balancing. In one embodiment, an SDN switch provides application-based conditional forwarding and session-aware load balancing among ports so as to evenly distribute incoming traffic over different network security applications/devices, for example, without disturbing session integrity.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of application based packet forwarding, it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure generally relate to an SDN architecture. In particular, embodiments of the present disclosure relate to an SDN switch configured to provide application-based conditional forwarding and load balancing.

In an aspect, the present disclosure relates to a system that can include a packet receive module that can be configured to, at an SDN switch, receive a packet at an input port, and a packet forwarding module that can be configured to, at the SDN switch, forward the received packet to a first flow processing unit of the SDN switch. The system can further include a tracking decision based packet transmission module that can be configured to, at the first flow processing unit, determine if the received packet is to be tracked, wherein when the received packet is to be tracked, the received packet is transmitted to a second flow processing unit, else the packet is transmitted to a third flow processing unit. The system can further include a packet processing module that can be configured to, at the SDN switch, based on outcome of the tracking decision based packet transmission module, conditionally forward the packet to an application device if the packet is received at the second flow processing unit, else conditionally forward the packet to an output port or drop the packet if the packet is received at the third flow processing unit.

In an aspect, at the second flow processing unit, the packet can be forwarded to the application device when a session lookup match is found in the session table of the second flow processing unit; otherwise, when a session lookup match is not found, the packet can be forwarded to the third flow processing unit. In an aspect, at the second flow processing unit, the received packet can be processed for any or a combination of session setup, session update, or session delete. In another aspect, the application device can be a security application device.

In another aspect, at the third flow processing unit, the packet can be looked up into a flow table of the third flow processing unit to decide whether to drop the packet or forward the packet to the output port. In another aspect, the decision of whether the packet is to be tracked can be made based on parsing of the packet, and processing of the parsed packet with respect to a flow table that the first flow processing unit is operatively coupled with.

In another aspect, the first flow processing unit can be a type 1 flow processing unit, and the second and the third flow processing units can be type 2 flow processing units, wherein the type 2 flow processing units can include session tables. In an aspect, when a fourth flow processing unit of type 1 flow processing unit receives a second packet, the fourth flow processing unit can determine if the second packet is to be tracked, wherein when the second packet is to be tracked, the second packet can be transmitted to the third flow processing unit, else the packet can be transmitted to the second flow processing unit, and wherein when the second packet is received at the third flow processing unit, the third flow processing unit can conditionally process the second packet at an application device, else if the second packet is received at the second flow processing unit, the second flow processing unit can conditionally either forward the packet to a second output port or can drop the second packet. In an aspect, direction from the first flow processing unit to the fourth flow processing unit can be from client to server, and wherein direction from the fourth flow processing unit to the first flow processing unit can be from server to client. In another aspect, direction from the first flow processing unit to the fourth flow processing unit can be from north to south, and wherein direction from the fourth flow processing unit to the first flow processing unit can be from south to north.

In an aspect, method of the present disclosure can comprise the steps of receiving, at an SDN switch, a packet at an input port, and forwarding, at the SDN switch, the received packet to a first flow processing unit of the SDN switch. The method can further include the step of determining, at the first flow processing unit, if the received packet is to be tracked, wherein when the received packet is to be tracked, the received packet is transmitted to a second flow processing unit, else the packet is transmitted to a third flow processing unit. The method can further include the step of conditionally forwarding, at the SDN switch, the packet to an application device if the packet is received at the second flow processing unit, and conditionally forwarding the packet to an output port or dropping the packet if the packet is received at the third flow processing unit.

FIG. 1A illustrates an exemplary software defined networking (SDN) architecture designed in accordance with an embodiment of the present invention. FIG. 1 illustrates an exemplary layered architecture 100 having SDN switches 110 and SDN controller 108 configured therein for implementation of aspects of the present disclosure. As one may appreciate, software-defined networks present many advantages over traditional monolithic architecture networks. For example, control plane applications that implement network routing and switching functionalities are completely separated from forwarding plane or data plane. Thus, maintaining a centralized control plane enables highly customized and optimized networking services that can be tailored to specific user needs or specific network setup. A centralized control plane provides a highly scalable, reliable, and flexible networking infrastructure that can cater to diverse user needs. Although the embodiments of the present disclosure have been described referring to a centralized control plane, in different implementations, it is possible to have a localized control plane for configuring the SDN switches. The SDN abstracts the functionality of legacy hardware into three layers, an application layer, a control layer, and a forwarding layer, where the application layer includes applications and network services that are used to determine forwarding requirements, control layer converts forwarding information into flow-programmable statements (can use orchestration), and forwarding layer controls and configures flow-programmable hardware used to forward traffic.

In an embodiment, the application layer can include one or more applications 102 and one or more services 104 that can deliver open programmable interfaces to automate orchestration of network services, wherein SDN applications 102 present in the application layer can explicitly, directly, and programmatically communicate their network requirements and desired network behavior to orchestration 106 and SDN controller 108 via an application programming interface (API). In an embodiment, services 104 can include network security services, including, but not limited to, anti-malware services, anti-spam services, application control services, web filtering and IP reputation services. In an aspect, the APIs can be used for communication between the application layer and the control layer to support symmetric traffic flows and for enabling implementation of network security functions (NSFs).

In an exemplary implementation, the forwarding layer of architecture 100 can include one or more SDN switches 110-1, 110-2, ..., 110-N, which may be collectively referred to as SDN switches hereinafter 110, wherein the SDN switches 110 can be configured to use assigned set of values for processing data packets received by the switches 110. One advantage of flow processing in the manner described herein is that by using multiple flow processing units, scalability in flow programmability can be achieved by assigning flows based on ingress port match values.

In an aspect, orchestration 106 can be defined as the use of automation, i.e., the use of software to reduce operational workload of configuration, troubleshooting and asset management, in order to provide services through the use of applications 102 that drive the network. SDN can be configured/interpreted as a collection of logical parts, and orchestration 106 has an ability to weave the logical parts together into a working fabric. In an aspect, SDN controller 108 can be connected to the application layer via orchestration 106, which can be configured as a logical centralized entity that is in charge of translating requirements from the SDN application layer down to the forwarding layer or the data path layer, and to provide applications 102 with an abstract view of the network.

In an aspect, SDN controller 108 can handle all direct communications to network elements routed via orchestration 106. The operator directs SDN controller 108 as to what is needed, and the resources fall into place automatically. SDN controller 108 can have the ability to identify and correct network bottlenecks and other performance-inhibiting issues using a combination of advanced modelling and systems orchestration (which can happen across Ethernet, the OpenFlow Protocol and/or overlay networks). Also, in other terms, SDN controller 108 (also known as the "brains" of the network), offers a centralized view of the overall network, and enables network administrators to dictate to the underlying systems (e.g., switches and routers) how the forwarding layer should handle network traffic.

In an exemplary implementation, the SDN switches (e.g., SDN switch 110-1, SDN switch 110-2, SDN switch 110-3, and SDN switch 110-4), which may be collectively and interchangeably referred as SDN switche(s) 110 or Open-Flow-enabled switches 110, can be programmed using the OpenFlow Protocol and SDN architecture 100. SDN switches 110 can be programmed to define how to match packets with the configured existing rules, and how to forward the packets based on one or more configurable/programmable rules. SDN switches 110 can be programmed to switch packets to/from the network security devices. In a typical implementation, when a data packet is received from real time traffic, SDN switches 110 can determine pipelines to be used for forwarding the packet towards the destination. When SDN switches 110 observe an unknown flow and/or cannot determine how to forward the packets, SDN switches 110 may consult SDN controller 108 to determine what to do with the flow, and then based on the configuration received from SDN controller 108, make the appropriate decision. In general, SDN switches 110 may include multiple tables for storing the rules based on which the forwarding decisions can be made. In an exemplary implementation, the multiple flow tables of SDN switches 110 can generally be stored in Dynamic Random Access Memory (DRAM) and/or Ternary Content-Addressable Memory (TCAM) devices. In an exemplary implementation, SDN architecture 100 can be used for conditional forwarding and session-aware load balancing for security applications. In an exemplary implementation, SDN switches 110 can forward received packets to an appropriate security application device based on the active session and/or the load status of the security application/function.

Figure 1B:
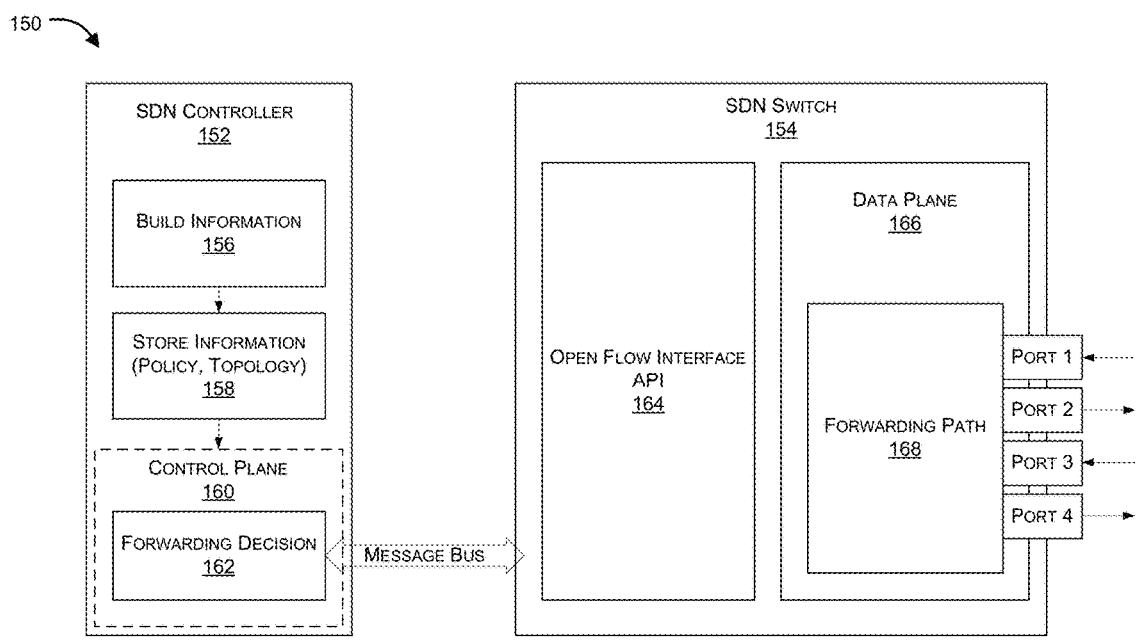
FIG. 1B illustrates an exemplary flexible data plane and control plane configuration of an SDN architecture that uses OpenFlow Protocol in accordance with an embodiment of the present invention.

FIG. 1B illustrates an exemplary data plane and control plane configuration of an SDN that uses the OpenFlow Protocol in accordance with an embodiment of the present invention. As shown, network architecture 150 can include an SDN controller 152 to manage network behavior, and an SDN switch 154 to forward packets toward their destinations based on pre-configured rules. In an aspect, SDN controller 152 can include functional blocks for build information 156, store information (policy and topology) 158, and a control plane 160 to store forwarding decision(s) 162 for processing the forwarding rules. In an exemplary implementation, SDN switch 154 can include an OpenFlow Interface API 164 using which SDN switch 154 can communicate with SDN controller 152, and a data plane 166 that can implement forwarding path 168 to forward a packet to a respective port, such as port 1, port 2, port 3 or port 4. As can be seen from the flexible data and control plane architecture of FIG. 1B, control logic/plane 160 has been moved to SDN controller 152, leaving SDN switches 154 only with forwarding elements, enabling one expensive SDN controller 152 to be coupled with multiple low cost SDN switches 154, and making the Openflow Protocol the protocol through which to send/receive forwarding rules between SDN controller 152 and SDN switch 154.

In an aspect, SDN switch 154 can be operatively coupled with SDN controller 152, wherein SDN controller 152 can be configured to build and maintain information 156 and store information (regarding policies and topologies) 158 based on which flow processing units (FPUs) of the SDN switch 154 can process packets using one or more forwarding rules that are implemented by SDN controller 152 and are associated with multiple ingress ports. In an exemplary implementation, SDN switch 154 can parse an incoming packet to retrieve an ingress port value indicated by the incoming packet, wherein the port value can be associated with a parameter selected from one or a combination of a defined port speed, a packet encapsulation characteristic, a port attribute, or a packet parameter. The main functionality of SDN switch 154 is to forward incoming packets based on forwarding rules configured in one or more flow tables.

In the context of networking, the phrase "control plane" refers to basic functions involved in making a forwarding decision 162, information required to facilitate that decision, and processing required to build and maintain that information. In an aspect, in order to make forwarding decisions 162 efficiently, SDN switch 154 can be equipped with specialized memory resources (e.g., TCAMs) to hold the forwarding information, wherein the specialized nature of this memory makes it difficult and expensive for each SDN switch to have large quantities of memory available for holding information about a large network. Hence, the OpenFlow Protocol facilitates removal of control plane 160 responsibilities from SDN switch 154, and also addresses the scalability problems along with it, thereby shifting the burden upstream to a more scalable and centralized Open-Flow-enabled SDN controller 152. When controlled via OpenFlow interface API 164, SDN switch 154 no longer makes forwarding decisions 162 (as they are made by controller 152). Therefore, SDN switch 154 no longer needs to maintain the information required to facilitate those decisions, and no longer needs to run the processes required to build and maintain that information. All of that responsibility can now be outsourced to the central overarching OpenFlow-enabled SDN controller 152 having control plane 160 with forwarding decision 162. To make a forwarding decision 162 requires having information and the nature of that information can be composed by the processes used to build it. In architecture 150, SDN controller 152 independently performs all three functions; building information 156, storing information 158, and making a decision. Open-Flow interface API 164 uses the concept of flows to identify network traffic based on predefined match rules that can be statically or dynamically programmed by SDN controller 152 to define how traffic should flow through network devices based on various parameters (e.g., usage patterns, applications and/or cloud resources), thereby enabling the network to be programmed on a per-flow basis and enabling the network to respond to real-time changes at the application, user and/or session levels.

Figure 1C:
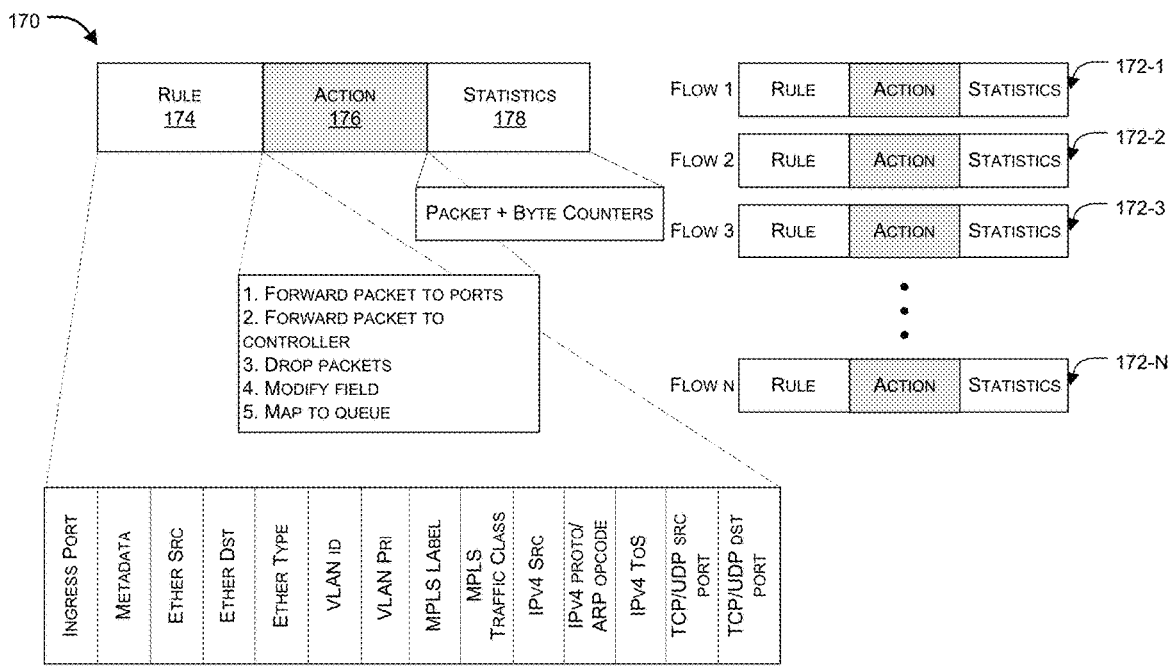
FIG. 1C illustrates an exemplary SDN flow in accordance with an embodiment of the present invention.

FIG. 1C illustrates exemplary SDN flows 172-1, 172-2, 172-3 and 172-N in accordance with an embodiment of the present invention. In an SDN controlled (e.g., OpenFlow Protocol enabled) packet switched network, a flow can be defined in a flexible way in terms of a combination of headers of a packet as shown in FIG. 1C. Incoming packets can be matched against flow definitions/forwarding rules and, upon finding a match, a set of actions can be performed, and statistics 178 can be updated. Packets that do not match any flow-table entry can be encapsulated and sent to the SDN controller, wherein the controller decides the way to process the packet and accordingly adds a new rule in the data plane flow-table. Successive packets with the same flow identifier can then be processed according to this new rule without involvement by the SDN controller. Therefore, while each packet is switched individually, a flow represents a basic unit of manipulation within the OpenFlow-enabled switch. In an aspect, three fields that define a flow table (FIG. 1C) can include a rule 174, an action 176, and statistics 178, wherein rule 174 can identify entries from the packet header that defines the flow with which the packet is associated. For instance, all packets that are addressed to a particular IP address and to a particular TCP/User Datagram Protocol (UDP) port (e.g., web traffic) can define a flow (e.g., a rule in the flow table), whereas action 176 establishes the way the packet is considered depending on rule 174. For instance, a packet can be dropped, or one or more of its fields can be modified, or it can be forwarded to a particular port (or ports) or to the SDN controller, or can be mapped to a queue in the SDN switch. Statistics 178 can gather packet related data (e.g., volume based billing or anti DDoS), which can be used by network applications to make dynamic and/or automatic decisions. Another potential use of statistics field 178 can be to establish a mechanism to set a lifetime for one or more flow entries, wherein, for instance, duration counters can measure the amount of time that a flow entry has been installed in an SDN switch.

The aforementioned processing represents extensions to the original OpenFlow specification in order to make it practically suitable for circuit switched domain. An OpenFlow circuit switch or hybrid switch can include a cross-connect table that can cache information about existing circuit flows (or cross-connects made in the switch), and a secure channel to an external controller, which can manage the switch over a secure channel using the OpenFlow Protocol.

Figure 2:
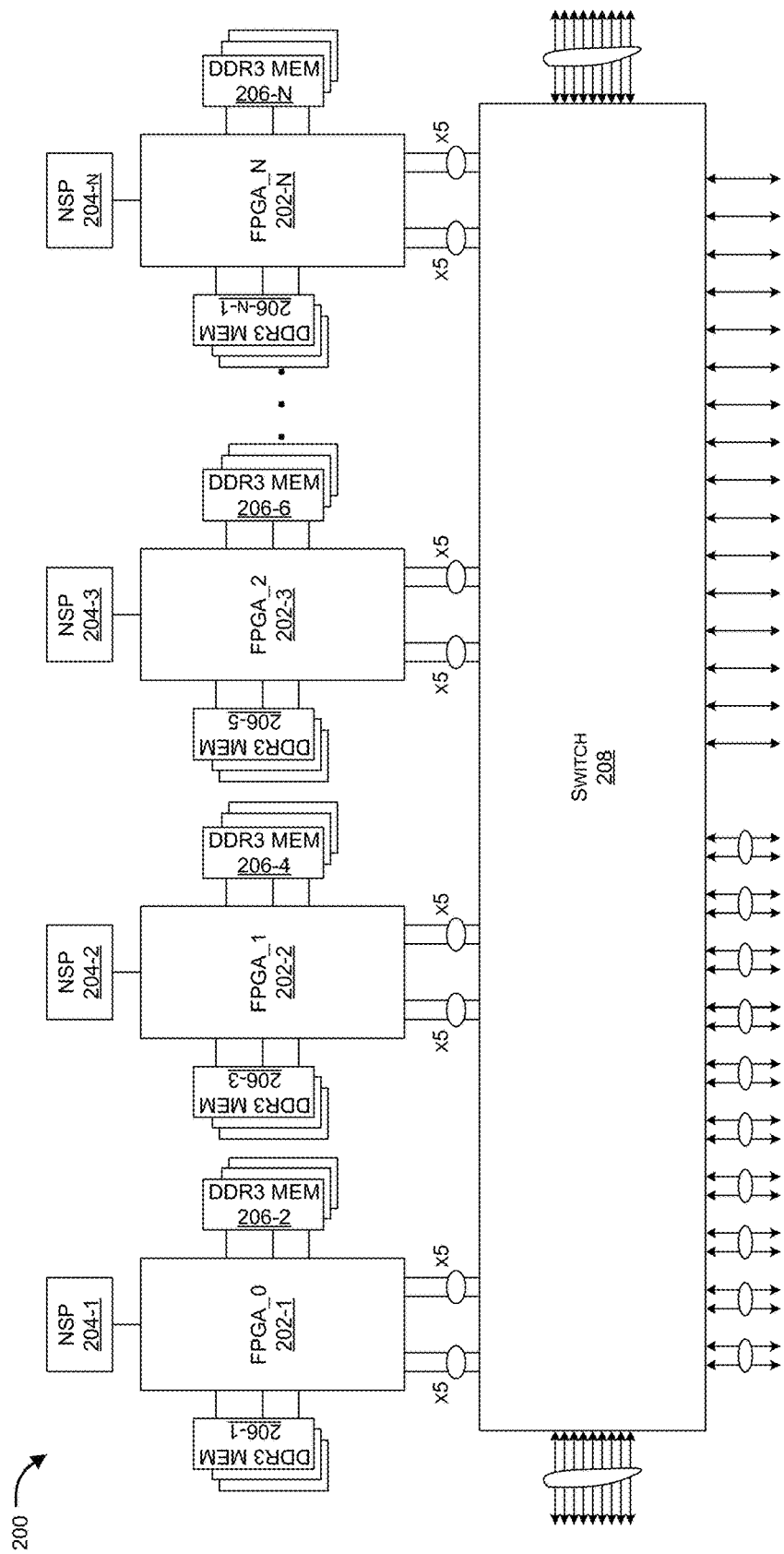
FIG. 2 illustrates an exemplary architecture of an SDN switch in accordance with an embodiment of the present invention.

FIG. 2 illustrates an exemplary architecture of an SDN switch 200 in accordance with an embodiment of the present invention. In the context of the present example, SDN switch 200 includes a switching fabric 208 to which multiple flow processing units (FPUs) 202 such as FPGA_0 202-1, FPGA_1 202-2, FPGA_2 202-3, and FPGA_N 202-N, which may be collectively and interchangeably referred to as flow processing units 202 hereinafter, are coupled. In an aspect, FPUs 202 can include internal resource partitions that can allow fast implementation of different modes of operation (e.g., transacting networking traffic to one or more corresponding ports, incorporating different tunneling protocols to direct/route/terminate traffic based on software defined actions, enabling network monitoring features with flow-based statistics collecting function, session tracking for conditional forwarding and/or security device load-balancing functions). In an exemplary embodiment, an FPU/FPGA 202 can be operatively coupled with one or a combination of DDR3 memory devices 206 and search processor/TCAM devices 204 that can be configured to store flow tables (e.g., multiple partionable flow tables), which can be used for referring to forwarding rules stored therein, and accordingly forwarding incoming packets based on the forwarding rules. According to one embodiment, search processor 204 may comprise a NEURON Search Processor (NSP). NEURON is a trademark or registered trademark of Cavium of San Jose, Calif.

In an exemplary aspect, SDN switch 200 can include N FPUs 202 with internal resource partitions, allowing fast implementation of different modes of operation by SDN switch 200. FPUs 202 can be configured to transect network traffic to one or more corresponding ports as defined in the flow tables, use different tunneling protocols to direct/route/terminate traffic based on the actions defined in the flow tables, perform network monitoring features, e.g., flow-based statistics collection function, and perform session tracking for conditionally forwarding traffic to service device and perform load balancing functions. In an aspect, OpenFlow Protocol based processing performed in FIG. 2 can address future network data path architectures that may require in-depth and high performance packet processing of independently operating content-aware SDN and services at line rate speeds while providing programmable deep packet inspection and classification of complex data types of OpenFlow based services designed to turn up technologies (e.g., the OpenFlow Protocol, security and filtering, traffic management, load balancing, rate shaping, and/or a variety of other appearing technologies).

It is to be appreciated that although the present disclosure has been described/explained with reference to four FPGA units 202 forming part of SDN switch 200, any number of FPUs 202 can be incorporated in SDN switch 200. Furthermore, SDN switch 200 can be associated with any number of memory devices including DRAM devices or TCAM devices or a combination thereof. Any number of ports (ingress and/or egress) can also be configured in SDN switch 200.

In an exemplary implementation, SDN switch 200 can be configured to receive a packet at an input port, and forward the received packet through switch 208 to a first FPU, say 202-1 (say, northbound FPU) of SDN switch 200. FPU 202-1 can then determine if the received packet is to be tracked, wherein when the received packet is to be tracked, the received packet can be transmitted via switch 208 to a second FPU say 202-2; otherwise, the packet can be transmitted to a third FPU, say 202-3. When the packet is forwarded to the second FPU 202-2, the second FPU 202-2 can conditionally forward the packet to an application device (e.g., a network security device); otherwise, when the packet is forwarded to the third FPU 202-3, the third FPU 202-3 can conditionally forward the packet to an output port via switch 208 or can drop the packet.

In an aspect, at the second flow processing unit 202-2, the packet can be forwarded to the application device when a session lookup match is found in the session table of the second flow processing unit 202-2; otherwise, when a session lookup match is not found, the packet can be forwarded to the third flow processing unit 202-3. In an aspect, at the second flow processing unit 202-2, the received packet can be processed for any or a combination of session setup, session update, or session delete.

In another aspect, at the third flow processing unit 202-3, the packet can be looked up into a flow table (stored in NSP 204-3, for example) of the third flow processing unit 202-3 to decide whether to drop the packet or to forward the packet to the output port. In another aspect, the decision of whether the packet is to be tracked can be made based on parsing of the incoming/received packet, and processing of the parsed packet with respect to a flow table (stored in DDR MEM 206-2, for example) that the first flow processing unit 202-1 is operatively coupled with.

In another aspect, the first flow processing unit 202-1 can be a type 1 FPU, and the second 202-2 and the third 202-3 FPUs can be a type 2 FPUs, wherein type 2 FPUs can include session tables. In an exemplary implementation, when a fourth FPU, say 202-4 of a type 1 FPU receives a second packet, the fourth FPU 202-4 can determine if the second packet is to be tracked, wherein when the second packet is to be tracked, the second packet can be transmitted to the third FPU 202-3; otherwise, the packet can be transmitted to the second FPU 202-2, and wherein when the second packet is received at the third FPU 202-3, the third FPU 202-3 can conditionally process the second packet at an application device; otherwise, if the second packet is received at the second FPU 202-2, the second FPU 202-2 can conditionally either forward the packet to a second output port or can drop the second packet. In an aspect, the directionality from the first FPU 202-1 to the fourth FPU 202-4 can be from client to server, and wherein the directionality from the fourth FPU 202-4 to the first FPU 202-1 can be from server to client. In another aspect, directionality from the first FPU 202-1 to the fourth FPU 202-4 can be from north to south, and wherein direction from the fourth flow processing unit 202-4 to the first flow processing unit 202-1 can be from south to north.

Figure 3A:
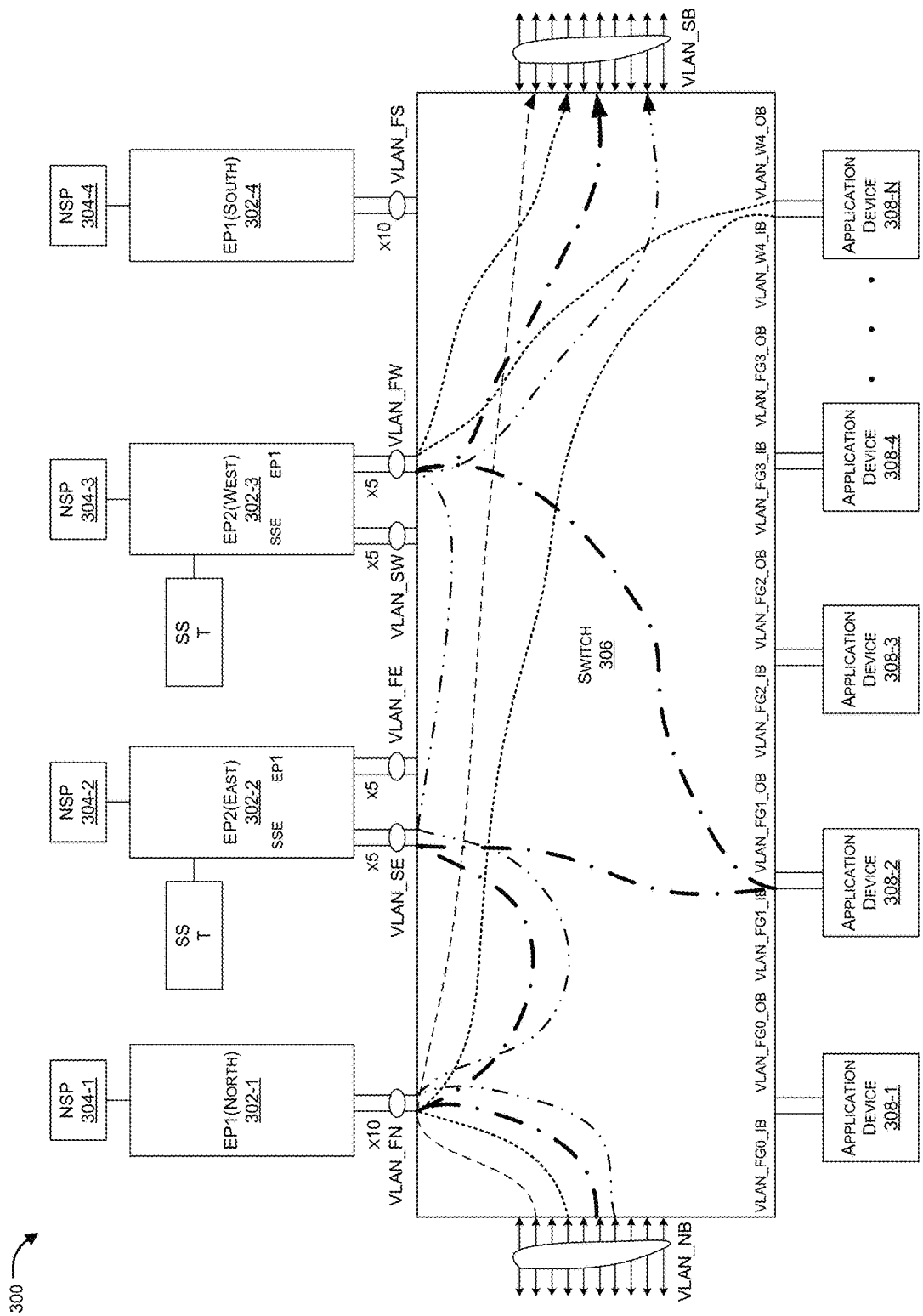
FIGS. 3A and 3B illustrate exemplary architectures of an SDN switch configured to provide application based conditional forwarding and session aware load balancing in accordance with an embodiment of the present invention.
Figure 3B:
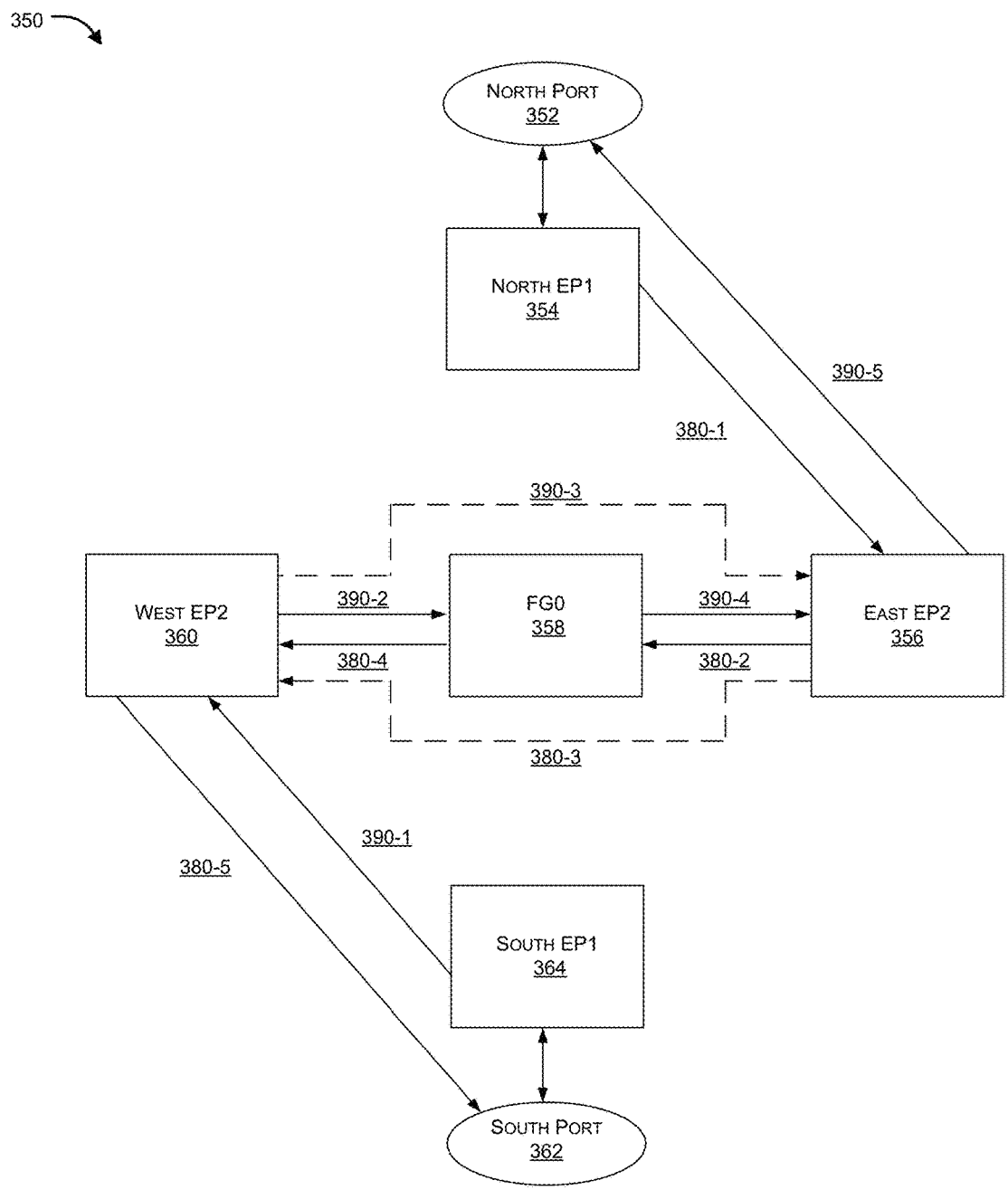

FIGS. 3A and 3B illustrate exemplary architectures of an SDN switch configured to provide application based conditional forwarding and session aware load balancing in accordance with an embodiment of the present invention. Data center designs make use of cartographic prime cardinal notations (e.g., North, South, East, West) analogous to a map. In this context, interfaces are subsequently described as Northbound, Southbound, etc. to describe the direction of traffic flow relative to the data center architecture. As such, the following directional terms may be used, when describing interfaces and traffic flows herein:

North—Represents the direction towards higher-tier components within the architecture, towards the Internet, and/or towards a public network space.

South—Represents the direction towards lower-tier components within the architecture, towards defined endpoint assets, and/or towards a private network space.

East—Represents the direction that is lateral towards common-tier components within the architecture, either within a data center or between data centers.

West—Represents the direction that is lateral from common-tier components within the architecture, either within a data center or between data centers.

Northbound Interface—Based on traffic egressing the interface, the Northbound interface is one in which traffic is forwarded North.

Southbound Interface—Based on traffic egressing the interface, the Southbound interface is one in which traffic is forwarded South.

Eastbound Interface—Based on traffic egressing the interface, the Eastbound interface is one in which traffic is forwarded East. The Eastbound interface denotes an interface used by a device to send traffic to another device performing a network function.

Westbound interface—Unlike other directional interfaces, this is based on ingress, rather than egress traffic. The Westbound interface is one that receives traffic from the East. The Westbound interface denotes an interface used by a device to receive traffic from another device which has performed a network function.

East-West Interface—As East and West represent traffic that is forwarded to and received from lateral or common-tier components with the architecture, it is often the case that a common interface can play both roles (such as in either a one-armed or otherwise bi-directional association between two devices), or that a set of Eastbound and Westbound interfaces in combination play both roles (as in forwarding traffic to/from a device that is parallel to the original device)

With reference to FIG. 3A, in an exemplary implementation, a packet can be received at VLAN_NB (North Bound) port (say the ingress port) of SDN switch 306, the packet can then be forwarded to flow processing unit (EP1) (North) 302-1, which can parse the received packet and determine, for example, based on NSP 304-1 flow table, whether the packet needs to be tracked or not. In an aspect, when the packet does need to be tracked, the packet can be forwarded to second flow processing unit EP2 (East) 302-2; otherwise, the packet can be forwarded to a third flow processing unit EP2 (West) 302-3. When the packet gets forwarded to EP2 (East) 302-2, the packet may need to be processed for session setup/update/delete, and as a result, can be conditionally forwarded to a security application device port when there is a session lookup match; otherwise, when a matching session cannot be located (e.g., a session lookup miss), the packet can be forwarded to EP2 (West) 302-3 for final forwarding to VLAN_SB (South Bound) port (say the egress port). On the other hand, when the packet is forwarded to EP2 (West) 302-3, the packet is again looked up into its respective NSP 304-3 flow table for action to be taken, wherein the packet can be dropped or can be forwarded to VLAN_SB (South Bound) port based on the match output from the NSP 304-3 flow table.

In an aspect, the reverse path for reverse traffic can also be incorporated, wherein, when a second packet arrives at VLAN_SB port (ingress port in this case), it can get forwarded to fourth flow processing unit EP1 (South) 302-4, wherein, at EP1 (South) 302-4, the second packet can either be forwarded to third flow processing unit EP2 (West) 302-3 or to second flow processing unit EP2 (East) 302-2 conditionally. At the third flow processing unit EP2 (West) 302-3, based on session lookup match output, the second packet get conditionally be forwarded either to a security application device port (upon a session lookup match) or to the second flow processing unit EP2 (East) 302-2 (upon a session lookup miss). At the second flow processing unit EP2 (East) 302-2, the second packet can either be dropped or can be forwarded to VLAN_NB port based on action from NSP flow table.

FIG. 3B illustrates a simplified flow diagram 350 of forwarding paths of conditional forwarding and session aware load balancing in accordance with an embodiment of the present invention. In the context of the present example, it is assumed the SDN switch includes 4 flow processing units (EPs) (in another implementation any number of FPUs can be configured), wherein North EP1 and South EP1 are type 1 FPUs, and East EP2 and West EP2 are type 2 FPUs, and wherein the type 2 FPUs can include and/or be associated with at least one session table.

In an exemplary implementation, an incoming packet received at North Port 352 can be sent to North EP1 354 for following a south bound path flow, wherein, at North EP1 354, it can be checked whether the packet is to be tracked such that if the packet is to be tracked, the same can be forwarded to East EP2 356 (through path 380-1); otherwise, to West EP2 360 (path not shown). At East EP2 356, a session lookup can be performed for the packet in a session table with which FPU East EP2 356 is associated, wherein when a session lookup match is found, the packet can be sent (through flow path 380-2) to an application device FG0 358 for processing; otherwise, upon a session lookup miss, the packet can be sent to West EP2 360 through flow path 380-3. When the packet is processed by the application device FG0 358 (e.g., a network security appliance), after the application device processing, the packet can be sent using flow path 380-4 to West EP2 360. In an aspect, West EP2 360 can, based on its flow table, either drop the packet, or send it to output port 362 (South Port) (using flow path 380-5).

In another exemplary implementation, with reference to FIG. 3B, an incoming packet received at South Port 362 can be sent to the South EP1 364 for following a north bound path flow, wherein, at the South EP1 364, it can be checked whether the packet is to be tracked such that if the packet is to be tracked, the same can be forwarded to West EP2 360 (through path 390-1) else to East EP2 356 (path not shown). At West EP2 360, a session lookup can be performed for the packet in a session table that the flow processing unit West EP2 360 is associated with, wherein when a session lookup match is found, the packet can be sent (through flow path 390-2) to the application device FG0 358 for processing; otherwise, on a session lookup miss, the packet can be sent to East EP2 356 through flow path 390-3. When the packet is processed by the application device FG0 358 (e.g., a network security appliance), after application device processing, the packet can be sent using flow path 390-4 to the East EP2 356. In an aspect, the East EP2 356 can, based on its flow table, either drop the packet, or send it to the north port 352 (using flow path 390-5).

In an aspect, conditional flow forwarding path direction 380 can be referred to as direction from client to server, whereas conditional flow forwarding path direction 390 can be referred to as direction from server to client. Furthermore, in another aspect, the dotted lines indicate a conditional forwarding path segment in which no session is found in the session table.

Figure 4:
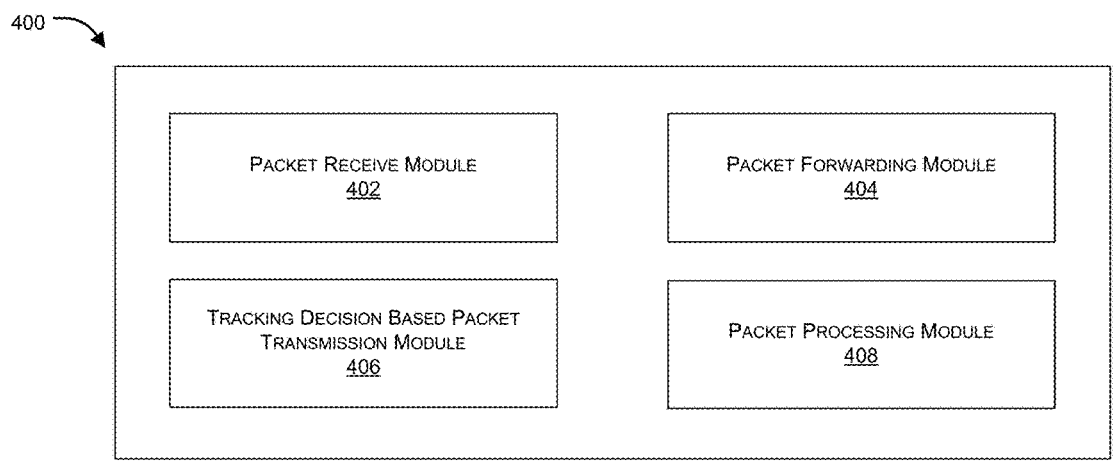
FIG. 4 illustrates an exemplary functional module diagram of an SDN switch that provides application based conditional forwarding and session aware load balancing in accordance with an embodiment of the present invention.

FIG. 4 illustrates an exemplary functional module diagram of an SDN switch 400 that provides application based conditional forwarding and session aware load balancing in accordance with an embodiment of the present invention. An embodiment of the present disclosure provides an SDN switch 400 that can include a packet receive module 402 that can be configured to, at SDN switch 400, receive a packet at an input port, and a packet forwarding module 404 that can be configured to, at SDN switch 400, forward the received packet to a first flow processing unit of SDN switch 400.

In an aspect, SDN switch 400 can further include a tracking decision based packet transmission module 406 that can be configured to, at the first FPU, determine if the received packet is to be tracked, wherein when the received packet is to be tracked, the received packet is transmitted to a second FPU; otherwise, the packet is transmitted to a third FPU. SDN switch 400 can further include a packet processing module 408 that can be configured to based on outcome of the tracking decision, conditionally forward the packet to an application device if the packet is received at the second FPU; otherwise, conditionally forward the packet to an output port or drop the packet if the packet is received at the third FPU.

In an aspect, at packet processing module 408, the second FPU can be configured to forward the packet to the application device when a session lookup match is found in the session table of the second FPU, wherein when a session lookup match is not found, the packet can be forwarded to the third FPU. In an aspect, at the second FPU, the received packet can be processed for any or a combination of session setup, session update, or session delete.

In another aspect, the application device can be a security application device or any other network device that can be configured to process the packet. In yet another aspect, at the third FPU, the packet can be looked up into a flow table of the third FPU to decide as to whether to drop the packet or to forward the packet to the output port.

In an aspect, the decision of whether the packet is to be tracked or not can be made based on parsing of the packet, and processing of the parsed packet with respect to a flow table with which the first FPU is operatively coupled. For instance, the parsed packet can indicate the port to which the packet is to be sent and the FPU that such a port is associated with so that the packet can be sent to the correct/mapped FPU for further processing. As mentioned with respect to FIGS. 3A and 3B, the first FPU can be a type 1 FPU, and wherein the second and the third FPUs can be type 2 FPUs, wherein the type 2 FPUs can include session tables.

In an aspect, when a fourth FPU of a type 1 FPU receives a second packet, the fourth FPU can determine if the second packet is to be tracked, wherein when the second packet is to be tracked, the second packet can be transmitted to the third FPU; otherwise, the packet can be transmitted to the second FPU, and wherein when the second packet is received at the third FPU, the third FPU can conditionally process the second packet at an application device; otherwise, if the second packet is received at the second FPU, the second FPU can conditionally either forward the packet to a second output port or can drop the second packet. In an aspect, the directionality from the first FPU to the fourth FPU can be from client to server, and wherein the directionality from the fourth FPU to the first FPU can be from server to client. In yet another aspect, the directionality from the first FPU to the fourth FPU can be from north to south, and wherein the directionality from the fourth FPU to the first FPU can be from south to north.

Figure 5:
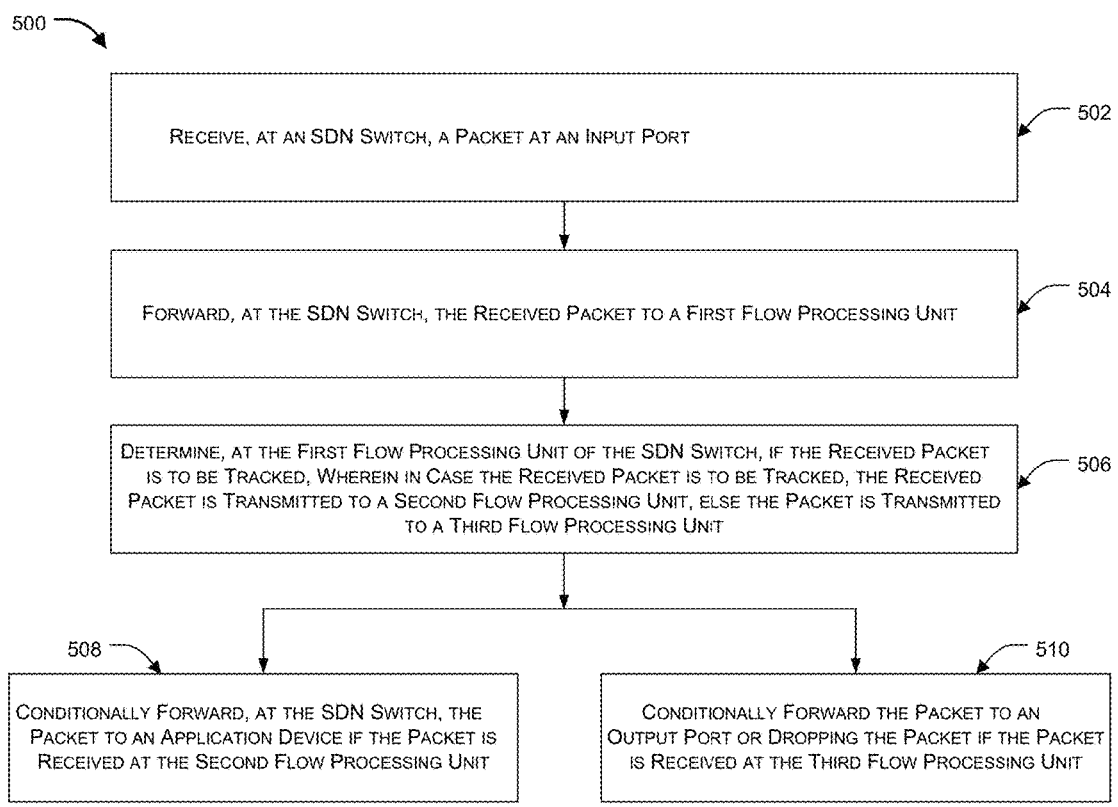
FIG. 5 illustrates an exemplary flow diagram of a method of application based conditional forwarding and session aware load balancing in accordance with an embodiment of the present invention.

FIG. 5 illustrates an exemplary flow diagram 500 of a method of application based conditional forwarding and session aware load balancing in accordance with an embodiment of the present invention. In an aspect, the method can include the steps of, at 502, receiving, at an SDN switch, a packet at an input port, and, at step 504, forwarding, at the SDN switch, the received packet to a first flow processing unit of the SDN switch. The method can further include the step of, at step 506, determining, at the first flow processing unit, if the received packet is to be tracked, wherein when the received packet is to be tracked, the received packet is transmitted to a second flow processing unit, else the packet is transmitted to a third flow processing unit. The method can further include, at step 508, conditionally forwarding, at the SDN switch, the packet to an application device if the packet is received at the second flow processing unit, and at step 510, conditionally forwarding the packet to an output port or dropping the packet if the packet is received at the third flow processing unit.

Figure 6A:
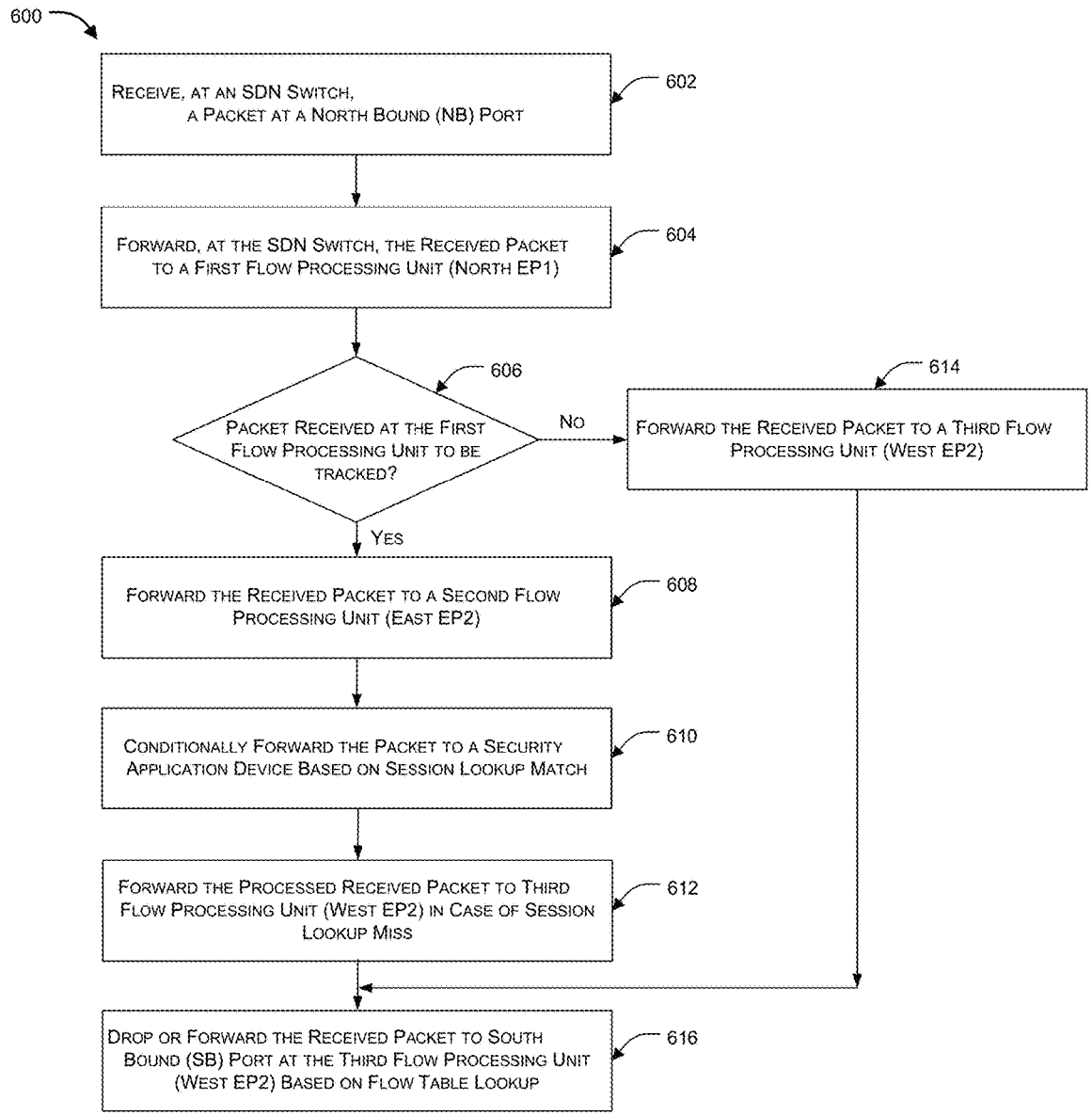
FIG. 6A illustrates an exemplary flow diagram showing data flow for a packet received at a north bound (NB) port in accordance with an embodiment of the present invention.

FIG. 6A illustrates an exemplary flow diagram 600 showing data flow for a packet received at a north bound (NB) port in accordance with an embodiment of the present invention. At step 602, the packet is received at an NB port, and at step 604, the packet can be forwarded by the SDN switch to a first flow processing unit (North EP1). At step 606, it is determined if the packet received at the North EP1 is to be tracked, wherein when the packet is to be tracked, at step 608, the packet is forwarded to a second flow processing unit (East EP2), which can, at step 610, conditionally forward the packet to an application device responsive to a session lookup match or forward the packet, at step 612, to third flow processing unit (West EP2) responsive to a session lookup miss. When, at North EP1, it is decided that the packet is not to be tracked, at step 614, the packet can be forwarded to third flow processing unit (West EP2), which can at step 616, using its flow table, either drop the packet or forward the received packet to Southbound (SB)/output port.

Figure 6B:
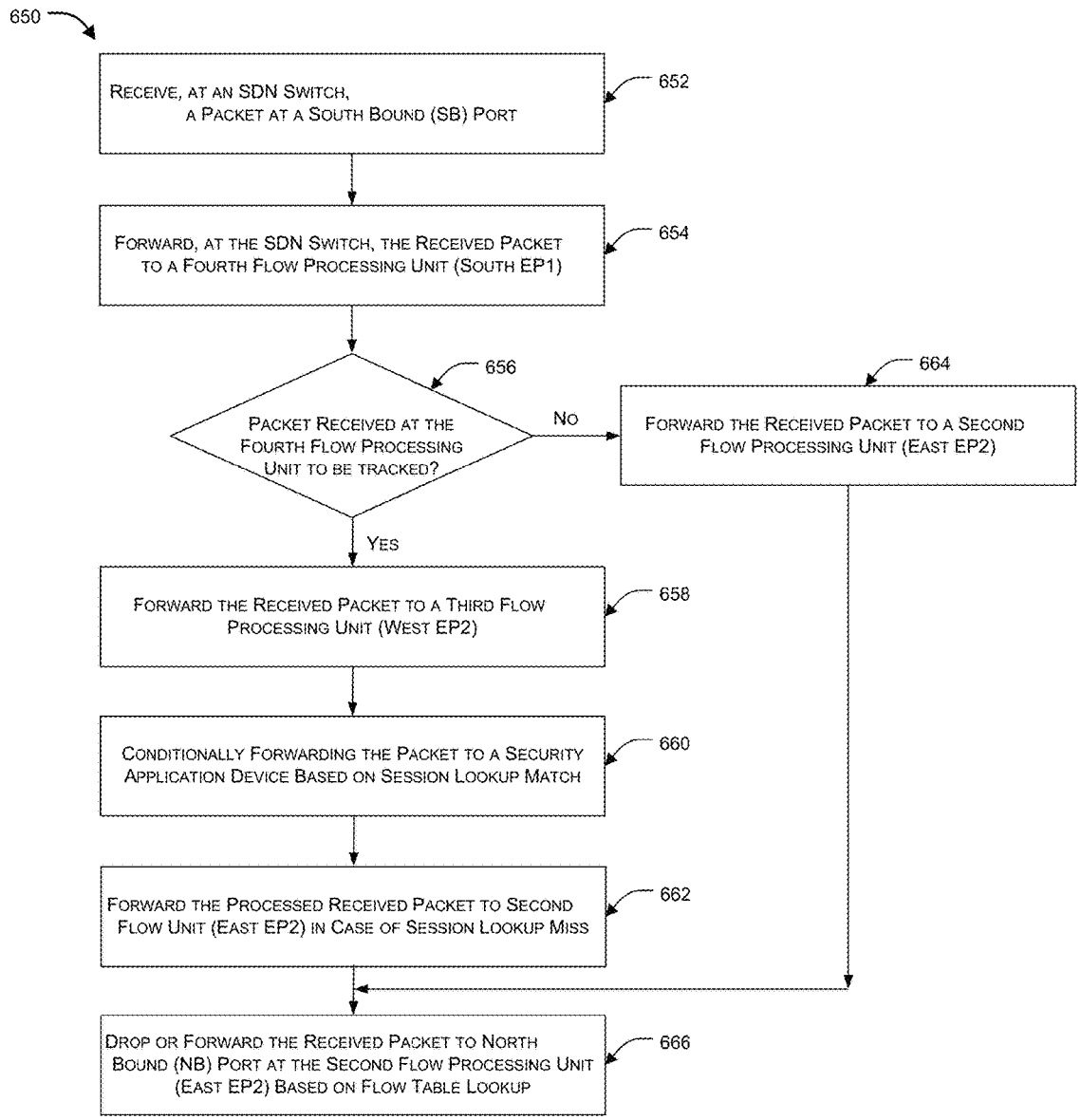
FIG. 6B illustrates an exemplary flow diagram showing data flow for a packet received at a south bound (SB) port in accordance with an embodiment of the present invention.

FIG. 6B illustrates an exemplary flow diagram 650 showing data flow for a packet received at a south bound (SB) port in accordance with an embodiment of the present invention. At step 652, the packet is received at an SB port, and at step 654, the packet can be forwarded by the SDN switch to a fourth flow processing unit (South EP1). At step 656, it is determined if the packet received at the South EP1 is to be tracked, wherein when the packet is to be tracked, at step 658, the packet is forwarded to the third flow processing unit (West EP2), which can, at step 660, conditionally forward the packet to an application device responsive to a session lookup match or forward the packet, at step 662, to the second flow processing unit (East EP2) responsive to a session lookup miss. When, at South EP1, it is decided that the packet is not to be tracked, at step 664, the packet can be forwarded to second flow processing unit (East EP2), which can at step 666, using its flow table, either drop the packet or forward the received packet to Northbound (NB)/output port.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method of processing packets received by a software defined networking (SDN) switch, wherein the SDN switch includes a plurality of flow processing units (FPUs), a northbound interface coupled to a public network, a southbound interface coupled to a private network, and a westbound interface and an eastbound interface coupled to a plurality of application devices, the method comprising:
    receiving, by the SDN switch, a packet via an input port of the northbound interface;
    forwarding, by the SDN switch, the packet to a first FPU selected from a first set of hardware-based FPUs of the plurality of FPUs, wherein the first set of hardware-based FPUs are of a first type that are configured to determine whether packets received from the northbound interface are to be tracked by obtaining a first forwarding decision regarding the packets by matching one or more portions of the packets against a first flow table associated with the first FPU;
    determining, by the first FPU, whether the packet is to be tracked, wherein when the packet is to be tracked, the packet is forwarded to a second FPU selected from a second set of hardware-based FPUs of the plurality of FPUs, wherein the second set of hardware-based FPUs are of a second type that include a session table;
    conditionally forwarding, by the second FPU, the packet to a third FPU selected from the second set of hardware-based FPUs after causing the packet to be processed by an application device of the plurality of application devices when the packet matches a session in the session table, otherwise, when the packet misses the session table, then forwarding the packet to the third FPU without the packet being processed by the application device;
    determining, by the third FPU, whether to drop the packet or to forward the packet to the private network via the southbound interface by obtaining a second forwarding decision regarding the packet by matching the one or more portions of the packet against a second flow table associated with the second FPU.

2. The method of claim 1, wherein the plurality of FPUs comprise Field-Programmable Gate Arrays (FPGAs).

3. The method of claim 1, further comprising performing, by the second FPU, one or more of session setup, update or delete processing for the packet.

4. The method of claim 1, wherein the application device comprises a network security device.

5. A software defined networking (SDN) switch comprising:
    a northbound interface coupled to a public network;
    a southbound interface coupled to a private network;
    a westbound interface and an eastbound interface coupled to a plurality of application devices;
    a plurality of flow processing units (FPUs), wherein the plurality of FPUs include a first set of hardware-based FPUs of a first type and a second set of hardware-based FPUs of a second type, wherein the second set of hardware-based FPUs of the second type each include a session table;
    a switch fabric coupled to the northbound interface, the southbound interface, the westbound interface, the eastbound interface and the plurality of FPUs, wherein packets received via the northbound interface are directed to FPUs within the first set of hardware-based FPUs, wherein packets processed by one of the plurality of application devices and received via the westbound interface or the eastbound interface are directed to FPUs within the second set of hardware-based FPUs;
    wherein responsive to receipt of a packet by a first FPU of the first set of hardware-based FPUs, the first FPU determines whether the packet is to be tracked by obtaining a first forwarding decision regarding the packet by matching one or more portions of the packet against a first flow table associated with the first FPU, wherein when the packet is to be tracked, the packet is forwarded to a second FPU within the second set of hardware-based FPUs, otherwise, the packet is transmitted to a third FPU of the plurality of FPUs within the second set of hardware-based FPUs;

wherein responsive to receipt of the packet by the second FPU, conditionally forwarding, by the second FPU, the packet to the third FPU after causing the packet to be processed by an application device of the plurality of application devices when the packet matches a session in the session table, otherwise, when the packet misses the session table, then forwarding the packet to the third FPU without the packet being processed by the application device; and wherein responsive to receipt of the packet by the third FPU, determining, by the third FPU, whether to drop the packet or to forward the packet to the private network via the southbound interface by obtaining a second forwarding decision regarding the packet by matching the one or more portions of the packet against a second flow table associated with the second FPU.

6. The SDN switch of claim 5, wherein the plurality of FPUs comprise Field-Programmable Gate Arrays (FPGAs).

7. The SDN switch of claim 5, wherein the second FPU further performs by one or more of session setup, update or delete processing for the packet.

8. The SDN switch of claim 5, wherein the application device comprises a network security device.

* * * * *